Dec. 17, 1929.     T. U. WHITE     1,739,935
SUPERVISORY CONTROL SYSTEM
Filed Dec. 17, 1925     10 Sheets-Sheet 9

Fig.9.

WITNESSES:

INVENTOR
Thomas U. White.
BY
ATTORNEY

Dec. 17, 1929.　　　T. U. WHITE　　　1,739,935
SUPERVISORY CONTROL SYSTEM
Filed Dec. 17, 1925　　10 Sheets-Sheet 10

Fig. 10.

INVENTOR
Thomas U. White.
BY
ATTORNEY

Patented Dec. 17, 1929

1,739,935

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed December 17, 1925. Serial No. 76,008.

My invention relates to selector systems, and particularly to selector systems of the supervisory control type.

An object of my invention is to provide means for the selective control and supervision of remotely positioned mechanism.

Another object of my invention is to provide means for protecting against the incorrect operation of remotely disposed mechanism.

Another object of my invention is to provide means for selectively varying the characteristics of remote mechanism and simultaneously receiving back indications of the extent of such variations.

Another object of my invention is to provide means for automatically transmitting from a distant point changing conditions thereat such as voltages, gate openings, temperatures and etc.

Another object of my invention is to provide means for increasing the number of supervisory operations without increasing the original number of selectors.

Another object of my invention is to provide means for obtaining multiple selections on the selector switch "twenty-five impulse" system.

Still another object of my invention is to provide means whereby a plurality of stations may be operated over the same selectors.

Another object of my invention is to provide means for increasing the number of operations that may be performed with a single set of selector switches.

When power systems become large, the mechanism for supervising and controlling the increased number of equipment becomes unduly complicated. In such cases, it is essential to devise means for performing the greater number of operations than heretofore necessary with approximately the same apparatus as was formerly used.

The invention herein disclosed shows circuit arrangements which perform these larger number of operations using substantially the same amount of mechanism for selection as were heretofore used for the lesser number of operations. The development of supervisory control has called for the performance of a number of new operations such as control of gate openings, temperature and oil gauge readings. The means for performing all these functions are all embodied in the present invention.

In practicing my invention I use in addition to the well known finder switch an additional finder switch for first selecting the group in which the operated key is located the code sender being common to all the keys. At the receiver by means of a "switch over" relay twice the usual supervisory operations take place.

The system comprises, a control, supervisory and common return line connecting a dispatcher's office and a substation. At the dispatcher's office are located keys, supervisory lamps and selector mechanism. At the substation are located power mechanism and similar selector mechanism.

The selector mechanism enables the association of any key at the dispatcher's office with its equivalent power mechanism at the substation to thus place the mechanism under the control of the dispatcher.

Figure 1:
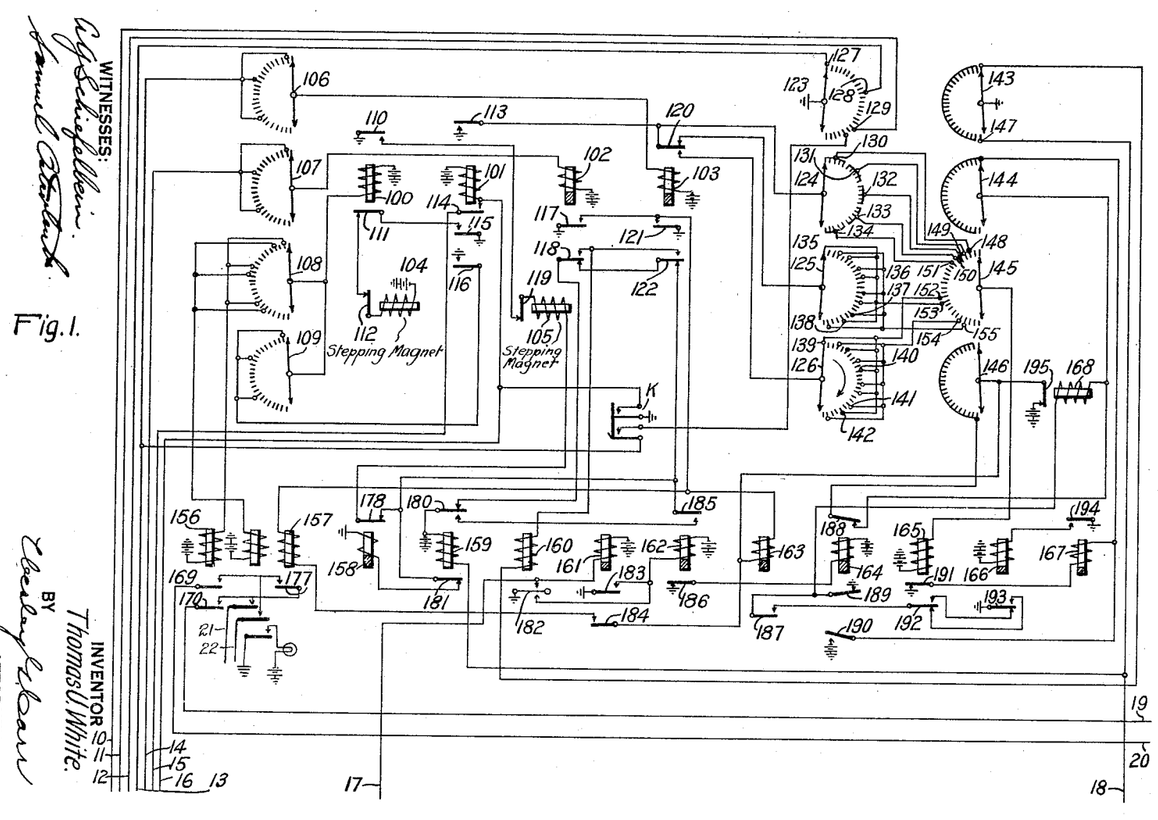
Figures 1, 7, 8 and 9 show the circuit arrangements at the dispatcher's office embodying my invention.
Figure 2:
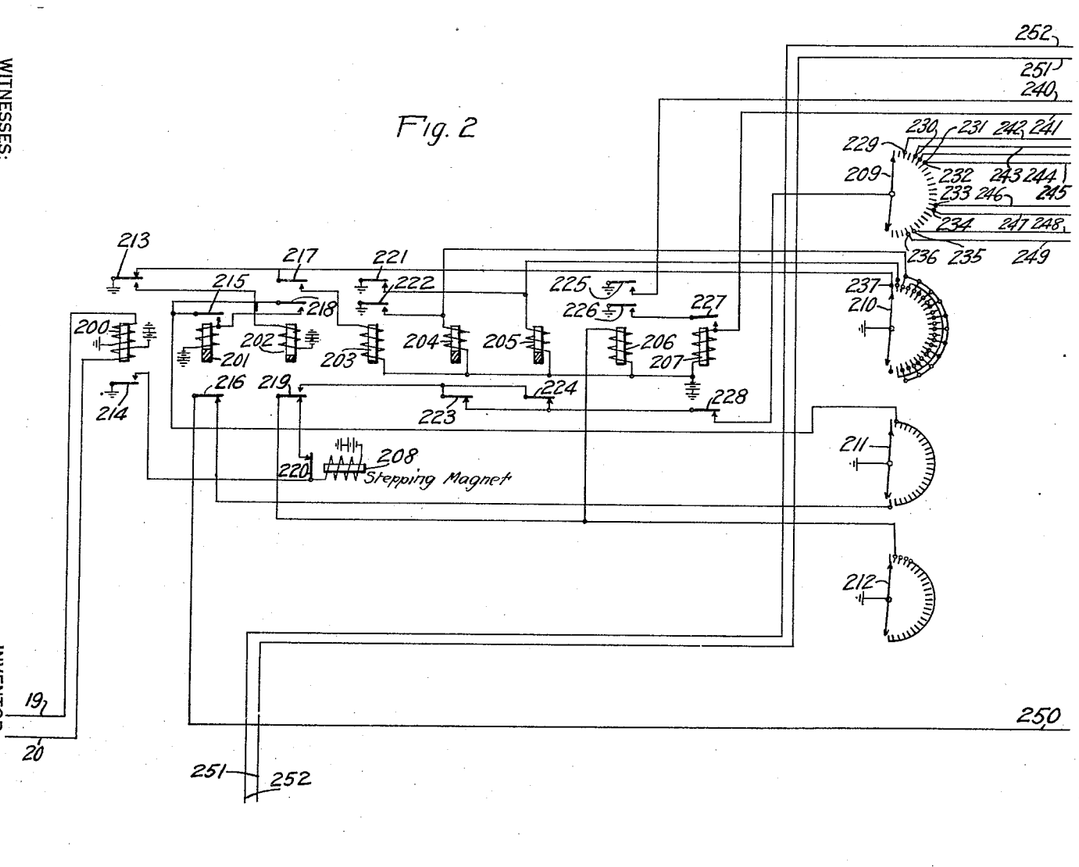
Figs. 2, 3, 4, 5, 6 and 10 show the circuit arrangements embodying my invention at the substation.
Figure 3:
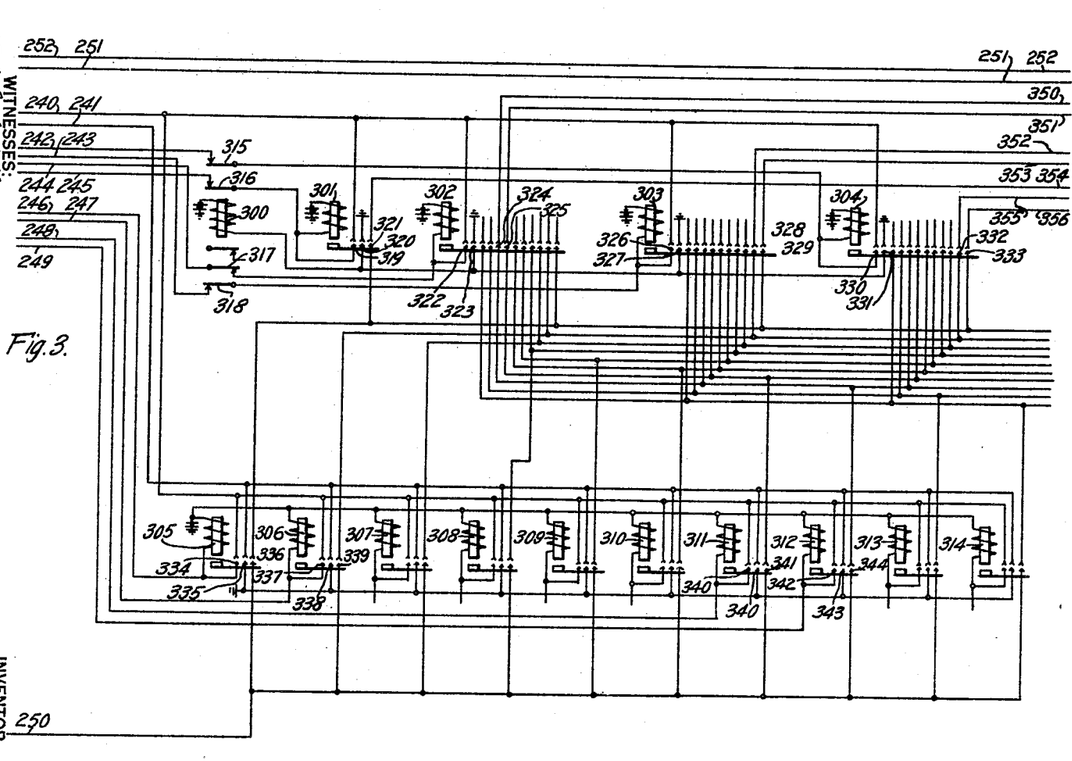

In Fig. 1 106 and 109 are the finder switches for finding the particular group of keys in which the operated key is located, such as individual key K. The finder switches are numbered 123 to 126 and code-sending switches 143 to 146. In Fig. 2, the code receiver at the substation comprises the switches 209 to 212 and its associated relays 200-208. In Fig. 3, relays 301 to 304 control groups of circuits and relays 305 to 314 control the particular circuit of the group associated with the substation apparatus desired to be operated.

Figure 4:
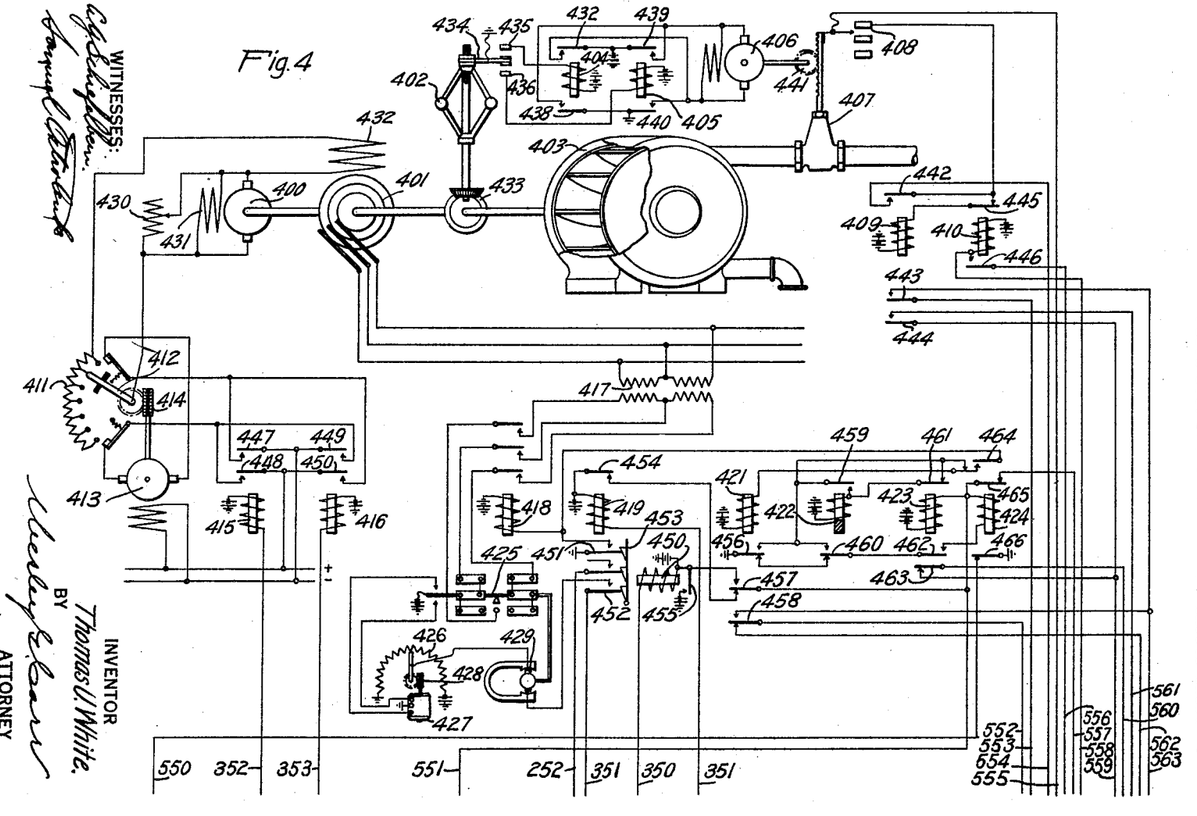
Figure 5:
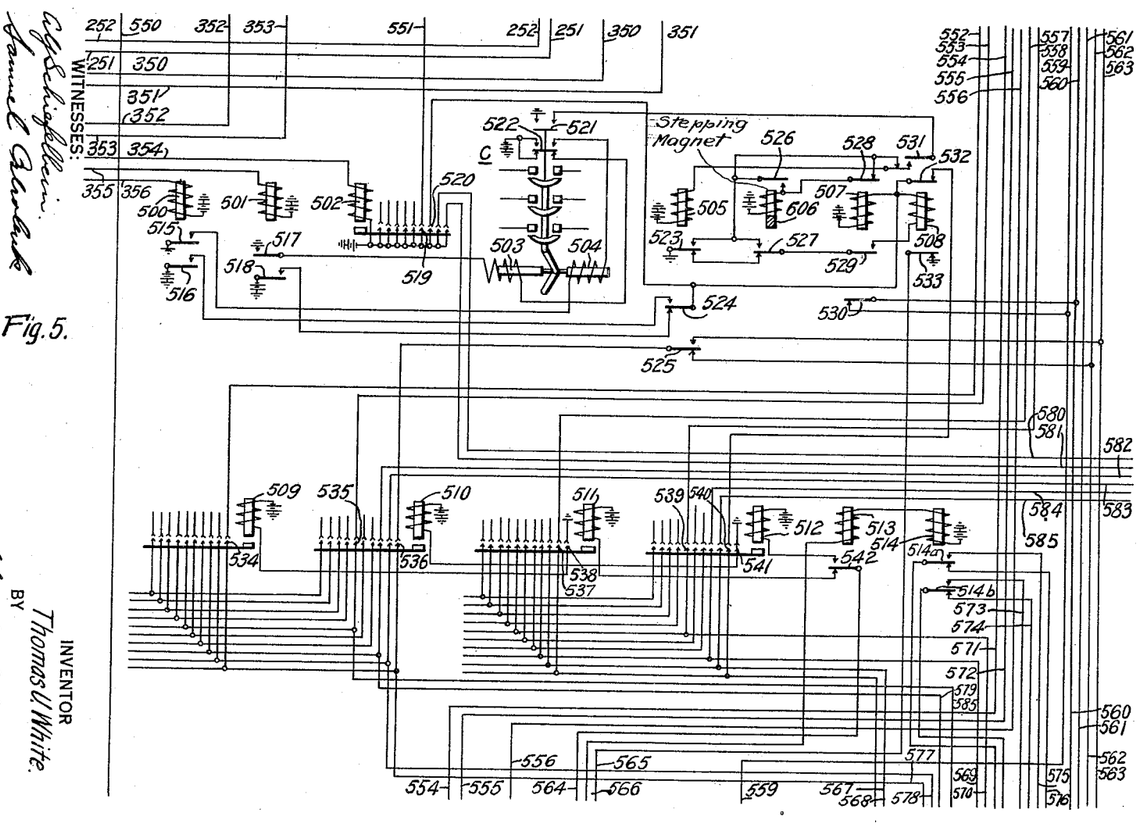
Figure 6:
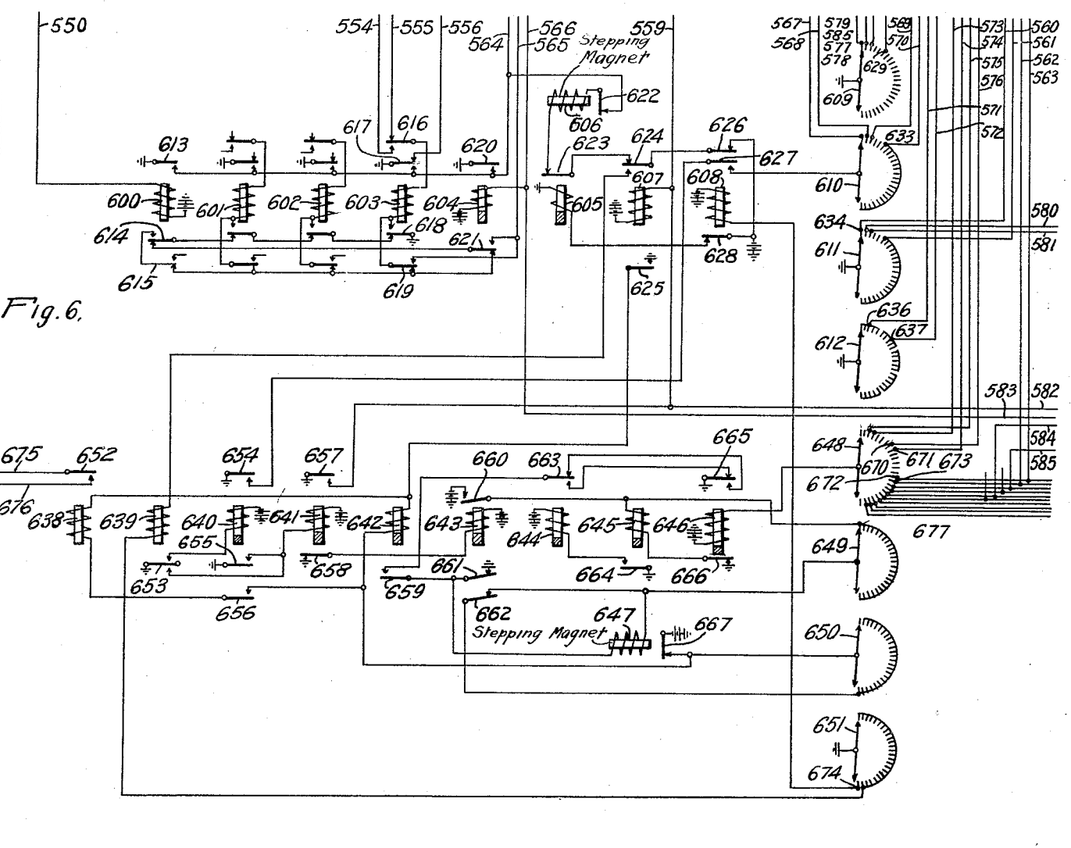
Figure 9:
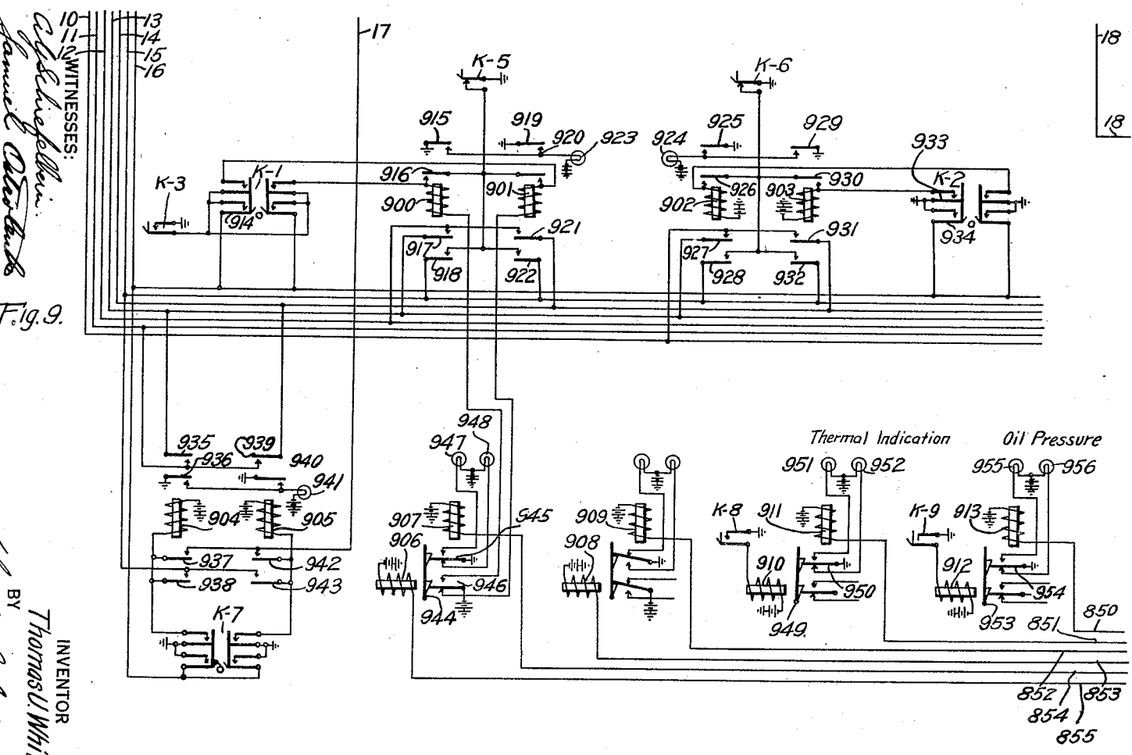
Figure 10:
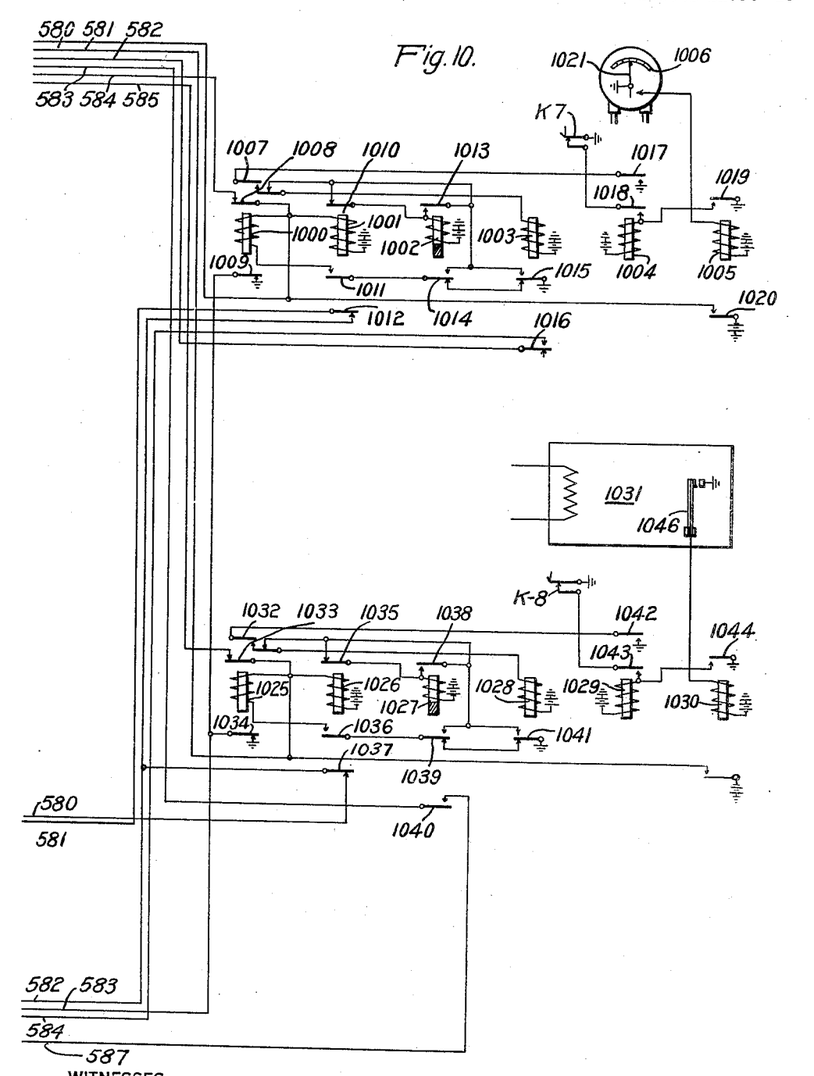

In Figs. 4, 5 and 10 are shown the substation apparatus with its associated mechanism for transmitting supervisory indications. In Fig. 6 the supervisory sender comprising finder switches 609 to 612 and code-sender switches 648 to 651 are shown. In Fig. 9 keys K—1 and K—2 are shown. It is understood, of course, that similar groups are similarly associated with the station finder switches 106 to 109. The lamps 947, 948, 951, 952, 955 and 956 are supervisory indicating lamps. Keys K5, K6 and etc. control the locking circuits of their individual key-operated relays 900, 901 and etc. In Fig. 10 are shown circuit arrangements for transmitting oil and temperature readings to the dispatcher's panel.

In transmitting an operating impulse to cause some power mechanism to function at the substation, the finder switches first rotate to find the group in which the key which has operated is located. The finder switches then find the key in the group. Following this, the code switches are stepped over their contacts to transmit a code comprising two pause periods. This code is individual to each key.

The code is received at the substation causing a set of switches to rotate to select the power mechanism according to the code which is to be operated.

Upon the closure of this power mechanism responsive to this operating impulse described, a set of finder switches are rotated to find the power mechanism which has been operated and its new condition. Responsive to this operation, a set of switches are rotated to transmit back to the dispatcher's office a code comprising two pause periods. This code is individual to the power mechanism operated and its condition.

The code is received at the dispatcher's office by the switches which cause supervisory lamps, shown in Fig. 9, to operate to indicate the new condition of the power mechanism. This, in brief, is the general operation which takes place responsive to the closing of the key by the dispatcher.

In Figure 1, the switches 106 to 109 are the means for first finding the particular station or group to which an operating code is to be sent over lines 19 and 20 or 21 and 22 each line being associated independently with a station.

Another novel feature is the circuit arrangements at the substation by which the number of supervisory signals that can be sent using the 25 contact code sender switch is doubled. The arrangement for performing this is shown in Fig. 5. When relays 513 and 514 are energized, they transfer the circuit to the code sender of any supervisory mechanism from any one of the first five contacts, to a corresponding one on the second five contacts. The relays 513 and 514 when energized close the contacts of relays 512 and 510 for operation and de-energization of relays 513 and 514 close the contacts of relays 511 and 509 for operation. A contact from the supervisory apparatus which would normally, for example, have been connected to the third contact of the code sender switch 648, is transferred by the energization of 513 and 514 to the 8th contact of the code sender 648.

Another feature of this invention is the circuit arrangement for operating an induction regulator located at a substation from a main station and also placing meters across power circuits for transmitting back to the dispatcher on a separate line and independent of other operations or meter indications. In Figure 4, by the operation of the dispatcher's key, relays 415 or 416 are energized, as will be explained later, to reverse the current in the motor 413, whereby the resistance 411 is either cut out or inserted in the circuit of the field winding 432 of induction regulator 401 and also in the circuit of field 431.

Relay 419 and relay 450 are also controlled by the dispatcher's key to place the Kelvin balance 425 across the power line by the energization of relay 418. A galvanometer 429 is operated as a result and transmits its readings to operate a meter at the dispatcher's office over the lines 250 and 251, which are independent of the regular operating and supervisory lines. Simultaneously, supervisory indications are sent over the regular supervisory lines to indicate that the correct meter was placed across the line. By the arrangement shown at 408, supervisory indications of the gate opening 407 are also transmitted.

In Figure 10, circuit arrangements for transmitting oil gauge and temperature gauge readings to the dispatcher's panel are shown.

In order to better illustrate this invention, a description of the operations which take place when a key is closed will be explained. As illustrated in the drawing in Fig. 5, the circuit breaker C is shown open. Let it be assumed that the dispatcher desires to close this particular circuit breaker. To do this the dispatcher will close the left-hand contacts of K—1 and the contact of K—3.

As a result of this operation, a circuit will be completed from ground at key K—3, the upper left-hand contacts 914 of K—1, relay 901, armature 946, battery to ground. Relay 901 individual to the key will be energized to close the contacts of its armatures. A circuit for the "key" indicating lamp 923 will be completed over armature 919. A locking circuit for relay 901 will be completed over K—5 and armature 920.

A circuit will also be completed from ground, contacts of switch K—3, lower left contact 914 of K—1, line 16, relay 101, battery to ground. Relay 101 individual to a station or group of keys closes a circuit for the stepping magnet of the station finder switches over armature 115 and stops these switches when the wipers reach the contact associated with the group in which the operated key is located by means of armature 116 and places ground on the second set of finder switches 123—126 at 113 the details of which follow. Energization of relay 101 will close a locking circuit for itself from ground through battery, relay 101, armature 114, conductor 15, armature 922, and K—5 to ground.

At armature 115 of relay 101, a circuit is completed for the stepping magnet 104. This stepping magnet opens its own circuit at 112 and operates as an interrupter to step the wipers 106 to 109 from contact to contact. The pawl controlled by the stepping magnet is positioned preparatory to stepping the wipers upon the energization of the stepping magnet and steps the wipers upon de-energization of the magnet. When the wipers 106—109 reach the contact associated with the station or group in which the operated key is positioned, a circuit is completed from ground, armature 116 to second contact of bank 109 and relay 100 to ground. Relay 100 is part of the switching mechanism functioning to stop rotation of the wipers when they reach the correct contacts. As a result of the energization of relay 100, the circuit for stepping magnet 104 is opened at armature 111. A circuit paralleling relay 100 is completed over wiper 108 to relay 156, thus preparing a closed circuit for conductors 19 and 20, the conductors associated with the station or group associated with the operated key. In this manner, a selection of the group in which the operated key is located is made simultaneously with a selection of the conductor over which the signals are to be sent.

Another result of the energization of relay 100 is to close a circuit for the stepping magnet 105 which steps the finder switches 123—126. This circuit is completed from ground, armature 110, armature 119 stepping magnet 105, armature 178, armature 128, armature 118, armature 180, and battery to ground. The particular station or group having first been found by the first mentioned set of finders, the second set now rotate to find the particular operated key.

Energization of stepping magnet 105 steps the wipers 123 to 126 in a manner similar to the operation of stepping magnet 104 until 123 reaches the contact 127 associated with the operated key. At this point a circuit is completed from ground, contact 127 of bank 123, line 12, armature 921, line 14, bank 107, its second contact, relay 102, battery to ground.

As a result of the energization of relay 102, the circuit just completed for relay 105 is opened at armature 118. At the same time, the battery for the circuit of stepping magnet 105, just traced, is transferred over the upper contact of armature 118 to relay 160, bank 143 to ground. Relay 160 is associated with the code sender. Energization of relay 160 energizes relay 161 and energization of relay 161 energizes relay 162 which opens the circuit for the relay 164 at armature 186.

The code sender will now function to transmit a code which comprises 25 impulses with two pause periods determined by the stopping position of the finder switches mentioned above and a third pause at the 25th contact.

A further result of the energization of relay 102 is the energization of relays 163 and 157 over a circuit from ground through armature 117, relays 163 and 157 in parallel, armature 195 and battery to ground. As a result of the energization of relay 157 which is the code transmitting relay, its armature closes the final contact of the line circuit 19—20 at 177 and transmits the first code signal.

One result of the de-energization of the relay 164 is the energization of relay 167 over a circuit from ground battery armature 190, relay 167, armature 191 to ground. Energization of relay 167 energizes relay 166 over the armature 194. As a result of the energization of relays 163 and 166, a circuit is completed from ground, armature 193, and its front contact armature 192 and its back contact armature 187, stepping magnet 168, bank 144 and its contact, armature 190, battery to ground. Stepping magnet 168 steps the banks 143 to 146 when de-energized from an energized state.

As a result of the energization of relay 168, it places its pawl in position to step the banks 143 to 146 and, at armature 195, opens the previously traced circuits for relays 157 and 163. De-energization of relay 157 opens the line circuit at armature 177 for the end of the first operating impulse.

De-energization of relay 163 opens the previously traced circuit for stepping magnet 168 at armature 187. Upon the de-energization of relay 168, the wipers 143 to 146 are stepped from the first to the second contact. As a result of the de-energization of relay 168, the circuits for relays 157 and 163 are again closed at armature 195. Energization of relay 157 closes the line circuits 19 and 20 at armature 177 for the second impulse of the operating code. Energization of relay 163 closes the circuit for stepping magnet 168. This cycle is then repeated, relay 168 being intermittently energized and de-energized to step the wipers 143 to 146 from contact to contact.

When the wiper 145 reaches the third contact 148, a circuit is completed from ground, battery, relay 165, wiper 145, its third contact, the first contact of the first group of wipers 124, armature 113 to ground. Energization of relay 165 opens the circuit for the stepping magnet 168 at armature 192 preventing its energization over the armature 187 heretofore traced. Another result of the energization of relay 165 is to de-energize relay 167 at armature 191. During this period, while the stepping magnet 168 is de-energized, relays 157 and 163 remain energized over the circuit previously traced including armature 195, and a long impulse or pause period occurs.

As a result of the opening of the relay 167 at 191, relay 167 is de-energized after an interval of time and opens the circuit of the relay 166 at armature 194. Slow-release relay 166 is de-energized after an interval of time and the circuit is again completed for the stepping magnet 168 from ground, armature 193 and its back contact, armature 192 and its front contact, armature 187, relay 168, wiper 144, armature 190 battery to ground. Energization of relay 168 prepares the pawls to step the wipers 143 to 146 and also, as previously pointed out, opens the circuit for the relays 157 and 163 at armature 195. De-energization of relay 157 opens the line circuit at armature 177 for the end of the first pause period.

De-energization of relay 163 opens the circuit for the stepping magnet 168 at armature 187 and the wipers are stepped from the third to the fourth contact and the circuit for relay 165 is now opened at bank 145 de-energizing the relay 165. Relay 167 is energized over a circuit previously traced from ground and armature 191. Energization of relay 167 energizes relay 166 over a circuit including its armature 194.

The circuit for the stepping magnet is now again completed over the original circut with armature 193 in its upper position and armature 192 in its lower position. Impulses are now again sent over the line while the stepping magnet 168 is intermittently stepped, as explained before, until the wiper 145 reaches contact 153. A circuit is then completed from ground battery to relay 165, wiper 145, its contact 153, contact 135, wiper 125, armature 120, armature 113 to ground.

Energization of relay 165 again opens the circuit for the relay 167, as traced before, at its armature 191 and opens the circuit for the stepping magnet 168 at the armature 192 at its upper position. During the de-energization period of relay 168, relays 157 and 163 remain energized over the circuit previously traced, including armature 195 in its closed position. Relay 157 energized closes the line circuit 19 and 20 at armature 177 for the second pause period.

The de-energization of relay 167 at armature 191 opens the circuit for the relay 166 at armature 194, which, in turn, after an interval of time, is de-energized. The circuit for the stepping magnet is thereupon again completed over armature 193 in its lower position and armature 192 in its upper position, in a circuit as previously traced. Energization of relay 168 opens the circuit for the relay 163 and 157 at the armature 195. As a result of the de-energization of relay 157, the line 19—20 is opened at armature 177 for the end of the second pause period.

De-energization of relay 163 opens the circuit for the stepping magnet 168 at armature 187 and the wipers are stepped to the next contact. The circuit for the relay 165 is now opened at the bank 145. De-energization of relay 165 energizes relay 167 over a circuit including armature 191. Energization of relay 167 closes the circuit for the relay 166 at armature 194.

A circuit is now again completed over the original circuit for the stepping magnet 168, which continues to step the wipers 143 and 146 until the 25th contact is reached. At the 25th contact, the circuit for the stepping magnet 168 is opened at the bank 144 and relays 157 and 163 are held energized over a circuit including armature 195 during this de-energization period of relay 168.

A third or twenty-fifth synchronizing pulse pause period occurs at this time and the code sender immediately functions to reset the wipers 143 to 146 to their normal or first position. This will be described later.

When the relay 157 is closed to transmit the first code impulse over the lines 19—20, relay 200 at the substation is energized. Energization of relay 200 closes an energizing circuit for the relay 202 at the armature 213. A circuit is also closed for the stepping magnet 208 at armature 214. When the relay 157 is opened at the end of the first impulse period, the circuit for relay 200 is opened and the relay is de-energized.

As a result of the de-energization of relay 200, the stepping magnet 208 is de-energized and the wipers 209 to 212 are stepped from the first to the second contact in a manner similar to that described in connection with the banks 143 to 146.

When the wiper has passed its second contact, a circuit is completed from ground, wiper 211, its second contact, armature 218, relay 201, battery to ground. Relay 201 is energized to open a circuit at armature 216.

This circuit is the final operating circuit for operating the mechanism associated with the particular key closed. In order to insure that the correct mechanism has been selected, its circuit is held open at armature 216 until the 25th pause period. This pause period must occur simultaneously at both the dispatcher's office and the substation to de-energize relay 201 and close the circuit. This will be explained more thoroughly hereafter. A further result of the de-energization of relay 200 is to energize relay 203 from ground over armature 213 and its back contact, armature 217 and its front contact, relay 203, battery and ground. Energization of relay 203 energizes relays 204 and 205 over the armatures 222 and 221, respectively.

Energization of relays 204 and 205 opens the selecting circuit for selecting first the group and then the particular relay circuit of the group at armatures 223 and 224. Since the group selection is to take place only during the pause periods, it is apparent that the selecting circuit should be held opened until the pause periods occur. Relays 204 and 205 perform this function and, as will be hereinafter explained, one of these relays will be de-energized during the pause periods to close the selecting circuit.

A further result of the stepping of the wipers to their second contact is the energization of relay 206 from ground, battery, relay 206, bank and wiper 212 to ground. Energization of relay 206 prepares a locking circuit for relay 207 at armature 226 and also prepares a locking circuit for selected relays at armature 225, as will be explained hereinafter.

The relay 200 is now intermittently energized and de-energized in response to the hereinbefore-mentioned signals and energizes and de-energizes accordingly the stepping magnet 208 and the wipers 209 to 212 are stepped from contact to contact. When the first pause period occurs, relay 200 remains energized, due to the fact that the line is closed during this period. The stepping magnet 208 is also held energized at armature 214.

Since the first pause period occurs when the wipers are on their third contacts, the relay 204 will be held energized over wiper 210 at its third contact. After an interval of time relay 205 will be de-energized at bank 210 and will close at its armature 224 the first selecting circuit which extends from ground, wiper 212 and its bank, armature 219 and its front contact, armature 224 and its closed contact, armature 228 and its closed contact, wiper 209, contact 229, line 242, armature 315, relay 304 battery and ground.

Relay 304 is energized to close the contacts of its armature. A locking circuit for relay 304 is completed from ground, battery, relay 304, its contact 330, line 240, armature 225, closed, to ground. A circuit is also closed for the relay 300 from ground, battery, relay 300 over the contact 331, to ground. Energization of relay 300 opens the circuits for the group relays 301 to 304 at contacts 315 to 318 in order to prevent any further energization of any of these group relays.

At the end of the first pause period, relay 200 is de-energized to in turn de-energize stepping magnet 208 and the wipers are stepped to the next contact. Relay 205 is again energized over contact 210. It is understood, of course, that relays 204 and 205, being slow-release relays, do not de-energize during the comparatively short intervals, while the wiper 210 is off their respective contacts.

The second series of impulses now continue to be received over the line thereby intermittently energizing relay 200, which, in turn, intermittently energizes the stepping magnet 208 until the second pause period is reached. The second pause period occurs on the 16th contact 153 of the bank wiper 145. The bank 209 will, therefore, be on the 16th contact 234 when the second pause period occurs. The relay 205 will be energized over the wiper 210 at the 16th pause period. Relay 204 will, after an interval of time, be de-energized, due to the fact that its circuit is opened at the wiper and bank 210.

When relay 204 is de-energized, a selecting circuit is completed, as traced before, except at this time the wiper 209 being on the 16th contact, the circuit is completed over contact 234 and line 247, relay 306, to battery and ground. Energization of relay 306 prepares a locking circuit for itself from ground, battery, relay 306, contact 337, line 240, over armature 225, closed, to ground. A circuit is also completed from ground, contact 335, line 241, winding of relay 207 to battery and ground.

Energization of relay 207 closes a locking circuit for itself over its armature 227 and armature 226 at their front contacts. A further result of the energization of relay 207 is to open all selecting circuits at armature 228. No further selection can now be performed.

At the end of the second pause period, relay 200 is again de-energized and the stepping magnet 208 is de-energized to step the wipers to the next succeeding contact. The third group of impulses are now received over the line to intermittently energize and de-energize relay 200, which, in turn, intermittently energizes and de-energizes the stepping magnet 208 and the wipers are stepped around bank contacts.

When the wipers reach the 25th contact, the previously traced circuit for the relay 201 is opened at the wiper 211. After an interval of time, the relay 201 is de-energized. If, therefore, the third pause period over the line occurs at this instant, sufficient time will elapse to permit relay 201 to be de-energized and the operating circuit will be completed over armature 216. Should the groups of banks at the two stations not be in synchronism, the third pause will not occur when 211 is on its 25th contact, as a result of which relay 201 will not have had time to de-energize and no operation will take place. This insures against operation of any incorrectly selected mechanism. In other words the selector switches must have been in synchronism so as to have selected the correct mechanism before any operation will take place.

As soon as the relay 201 is de-energized during the 25th pause period, a circuit is completed from ground through wiper 211 and its bank contact 25, relay 216 de-energized, line 250, contact 339, contact 332, line 355, relay 501, battery and ground. Energization of relay 501 closes the circuit for the relay 503 from ground, armature 517, relay 503, contact 522, battery and ground. Energization of relay 503 closes the circuit breaker C which is associated with the key closed by the dispatcher. The restoration to normal of the mechanism at the control receiver (Fig. 2) will be explained hereafter.

The normal condition of the relays 507 and 508 is, as will be explained later, energized, these two relays being energized in a series circuit including armatures 529, 527 and 523. When relay 501 is energized, relay 507 is short-circuited over a circuit from mid-point between relays 507 and 508, armature 524 and 518 with its contact closed. As a result relay 507 is deenergized which in turn opens a circuit for the relay 508 at the armature 529.

Upon the closing of the circuit breaker, a circuit is completed from ground over contacts 521, armature 531 and its closed contact, relay 505 to battery and ground. As a result of the energization of relay 505, a circuit is completed for relay 506 from ground battery, relay 506, armature 528, armature 523 to ground. Relay 506 is energized over this circuit and closes a locking circuit for itself at its armature 526. As a result of the de-energization of relay 508, circuit is completed from ground, armature 533, line 566, relay 604 to battery and ground.

One result of energization of relay 604 is to close a circuit for the stepping magnet 606 from ground of armature 620, armature 622, relay 606, armature 623, armature 624, armature 626, battery and ground. A further result of the energization of relay 604 is to complete a circuit from ground over armature 618 over armature 614, and its back contact, armature 621 and its front contact, line 565, winding 513 and 514 in series to battery and ground.

The supervisory code-sender switch has circuits of a slightly different arrangement than has heretofore been disclosed. The usual arrangement has been to have the first five contacts associated respectively with each of the five groups on the finder switch as shown in connection with switch 124 in Fig. 1. In this case, this has been modified by having the first and the 6th, the 2nd and the 7th and so on respectively associated with the five groups. The 3rd contact connected to conductor 575 is associated with the front contact of the armature 514a of relay 514 while the 8th contact connected to conductor 576 is associated with the back contact of armature 514a. Similarly, the 4th contact is connected through conductor 573 to the front contact of armature 514 B and the 9th contact is connected through conductor 574 to the back contact of 514 B. This multiple connection permits the performance of double the usual number of supervisory operations. By dividing the supervisory operations into two groups, one group extending through the contacts of relay 512 and the other group extending through the contacts of relay 511.

In order to decrease the number of contacts necessary in each group, the contacts are further divided so that relays 512 and 510 control the apparatus units in one group and relays 511 and 509 in the other group, the apparatus of one group is operated to send a supervisory indication when relays 513 and 514 are energized. If the supervisory apparatus functioning is in the other group, relay 513 and 514 are de-energized and the armatures at their lower position transfer the circuits from 1st to 5th to the 6th to 10th contact on the code sender.

In this particular case, the circuit breaker C is in the first group mentioned and relays 513 and 514 are energized over circuits already traced.

As a result of the energization of relay 606, its pawl is placed in position to step the finder switch wipers 609 to 612 to their second contact and simultaneously, the relay 606 opens its own circuit at armature 622 to de-energize itself and step the wipers to their second contact. This relay acts as a vibrator stepping the wipers from contact to contact.

When the wiper 611 reaches its contact 634, a circuit is completed for grounded wiper 611, its contact 634, line 560, armature 530, line 559, relay 607 and battery and ground. Energization of relay 607 opens a circuit for the stepping magnet 606 at armature 624 and the wipers 609 to 612 stop.

Simultaneously with the de-energization of relay 606 the circuit for the stepping magnet is transferred at armature 624 to relay 639 over a circuit from ground, battery armature 626, armature 624, and its front contact, relay 639, bank 651 and its wiper to ground. Energization of relay 639 energizes relay 640, at armature 653 which in turn energizes relay 641 at armature 655. A locking circuit is completed for the relay 607 at armature 657.

Relay 643 is de-energized at armature 658. As a result of the de-energization of relay 643, a circuit is completed over its armature 660 for the relay 645. Energization of relay 645 completes an energizing circuit for the relay 644 at armature 664.

A further result of the energization of relay 607 is to complete a circuit from ground, armature 625, relay 642 and 638 in parallel, armature 667, battery and ground. As a result of the energization of relay 638, the circuit for lines 676 and 675, is completed and armature 652 and the first supervisory impulse is transmitted.

A circuit is now completed for the stepping magnet from ground, armature 665 and its back contact, armature 663 and its front contact, armature 659, stepping magnets 647, wipers 649 and its contact, armature 660, battery to ground. Stepping magnet 647 is energized over this circuit to prepare its pawl to step the wipers 648 to 651 one step and as a further result of the energization of the stepping magnet, the circuits previously traced for the relays 648 and 642 are opened at armature 667. Relays 638 and 642 are de-energized as a result of this. The first supervisory impulse is ended at this time by the opening of the circuit at armature 652. The de-energization of relay 642 opens the circuit for the stepping magnet 647 at the armature 659.

It is apparent from the circuits thus far traced that the supervisory code sender is identical with that of the operator's code sender and the circuits need not therefore be traced in detail. Relays 642 and 638 are intermittently energized with the stepping magnet 647 until the wiper 648 reaches its third contact. At this point a circuit is completed for the relay 646 from ground, battery, relay 646, wiper 648, its third contact, line 575, armature 514a and its front contact, line 571, first group 636, wiper 612 to ground.

Relay 646 is energized over this circuit to open the circuit for the stepping magnet at armature 665 and to open the circuit for the relay 645 at armature 666. This results in the first pause period and relay 638 and 642 remain energized.

After an interval of time, relay 645 opens a circuit for relay 644 which in turn de-energizes and the circuit for the stepping magnet is again completed over the front contact of armature 665 and the back contact of armature 663. Energization of the stepping magnet de-energizes relay 638 and 642. This ends the first pause period.

De-energization of relay 642 opens the circuit for the stepping magnet at the armature 659 and the wipers are stepped to the next succeeding contact. The circuit for the relays 646 is then opened at the wipers 648. The de-energization of relay 646 energizes the relay 645 which in turn energizes relay 644 and the circuit is again completed for the stepping magnet over the back contact of armature 665 and the front contact of armature 663.

The stepping magnet 647 and the relays 642 and 638 are now alternately energized and de-energized to send the second group of supervisory code signals. When the wiper 648 reaches the contact 672, a circuit is completed from ground, through the battery, relay 646, wiper 648, its contact 672, conductor 563, armature 525 and its front contact, contact 536, conductor 577, contacts 629, wipers 609 to ground. Relay 646 is energized over this circuit to open the circuit of the stepping magnet which in turn closes the circuit for the relay 638 and 642 and the second pause period takes place.

As stated before, the relay 645 is de-energized in turn to de-energize relay 644 after which the circuit for the stepping magnet is again completed. Energization of the stepping magnet de-energizes 638 and 642 to end the first pause period. De-energization of relay 642 opens the circuit for the stepping magnet at 659 and the wipers are stepped to the next succeeding contact. Relay 646 is now de-energized to in turn energize relay 645 which in turn energizes relay 644.

The third group of code signals are now transmitted while the stepping magnet 647 steps the wipers 648 to 651 from contact to contact until the 25th contact is reached. At this instant the circuit for the relay 639 is opened at wipers 651 to restore the code sender to normal as will be explained hereinafter.

A circuit is now completed from ground through wiper 651, contact 674, relay 608 and battery to ground. Energization of the relay 608 opens another point in the circuit of relay 639 and closes a circuit from ground through armature 654, armature 627, wipers 610 and its first contact, conductor 567, contact 540 to mid-point between relays 507 and battery to ground. Relay 507 is energized and completes a circuit from ground through battery, relays 507 and 508 in series, armature 529 and armature 527 and 523 at their front contacts to ground. The relays 507 and 508 are now restored to normal preparatory to receipt of further operating impulses.

Figure 7:
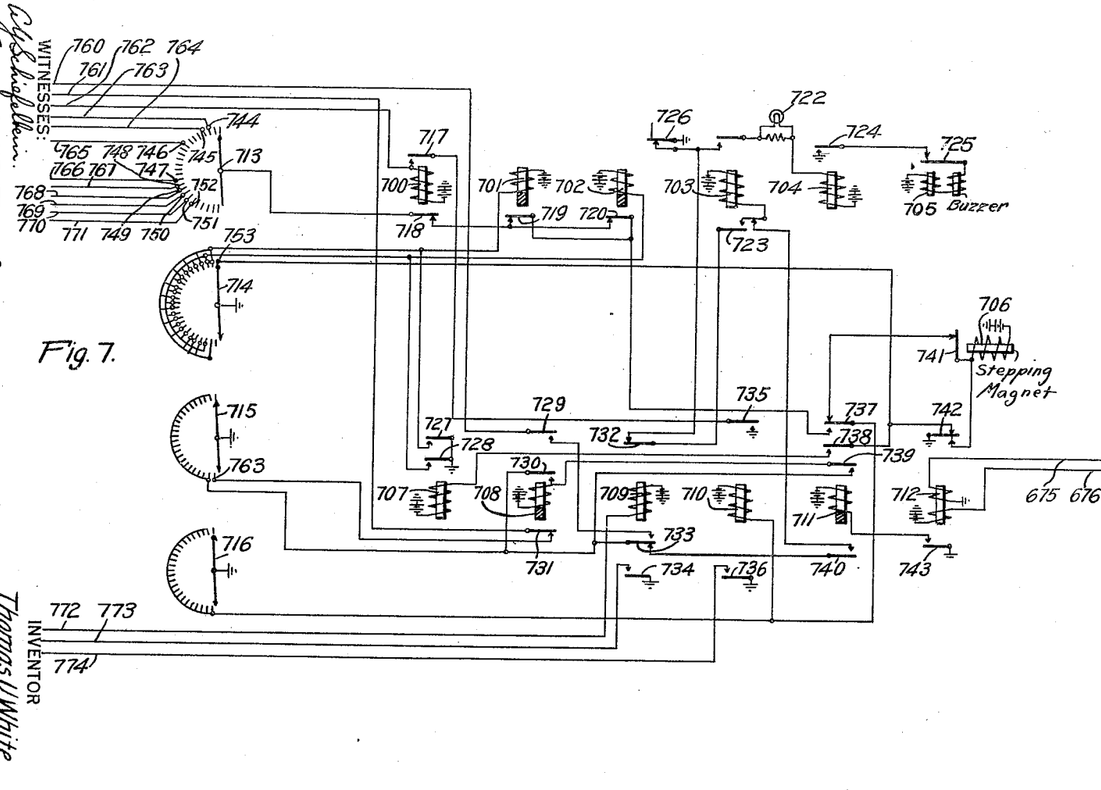

Opening and closing of the conductors 675 and 676, at armature 652 energizes and de-energizes relay 712. Energization of relay 712 energizes relay 711 over armature 743 and also the stepping magnet 706 at armature 742. Upon the de-energization of relay 712 when the line circuit is opened, relay 706 is de-energized to step the wipers to their second contact. Relay 707 is energized over armatures 738 and the back contacts of armature 742 and at its armatures 727 and 728 energizes the relays 701 and 702. The relays 701 and 702 open at their armatures 719 and 720 the selecting circuits so as to prevent any selection from taking place until a pause period occurs.

At the first pause period, as will be explained, one of these two relays will be de-energized and the selecting circuit will be closed. The relay 708 is energized over a circuit including armature 739 and its front contact and wiper and bank contact 715. The relay 708, at its armature 731, controls the operating circuit. This relay remains energized until the 25th pause period. After the banks 713 to 716 reach the 25th contacts simultaneously with the supervisory sending banks 648 to 651, the pause will take place at the proper time to de-energize this relay 708 and close the operating circuits, otherwise no operation will take place since obviously a false signal must have been sent. Relay 708 locks itself through the circuit of the armature 730. A circuit is also completed in parallel with the relay 708 through the armature 733 and its back contact, armature 740 and its closed contact, relay 703 and battery to ground. This will close a circuit for the lamp 722 and relay 704 to give a supervisory indication of the receipt of the first supervisory impulse. Energization of the relay 704 also closes the circuit for the buzzer 705 to call the attention of the dispatcher of the receipt of the supervisory impulse. If the operation of the circuit breaker was automatic, that is, independent of the operation by the dispatcher, this would be the only means the dispatcher would have to call his attention to the receipt of supervisory indication so that he could watch his lamps to observe where the change took place.

Figure 8:
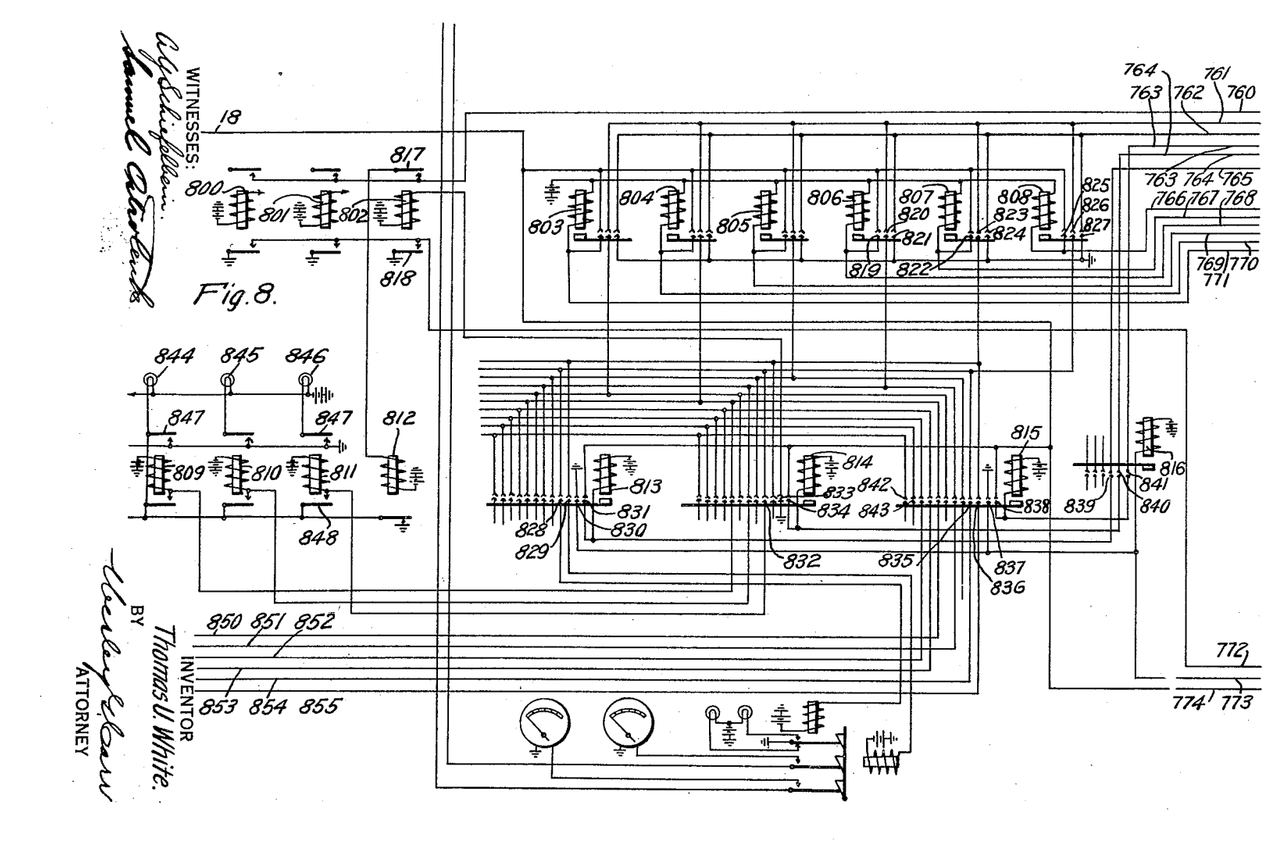

The signals now continue to be received and the wipers are stepped from contact to contact until the first pause period occurs. As has already been pointed out, the conductors 675 and 676 are energized during this period and hold the stepping magnet 706 energized preparatory to stepping the wipers. The pause occurs when the wipers are on the third contact, at which point, the relay 702 is energized and the circuit for relay 701 is opened. After an interval of time, the slow-release relay 701 is de-energized and a circuit is completed from ground through wipers 716 armature 737 and its front contact, armature 719, armature 718, wiper 713, contact 714, conductor 763, relay 815 and battery to ground. Energization of relay 815 closes a locking circuit for itself from ground through battery, relay 815, contact 838, and armature 736 to ground.

A circuit is also completed from ground through battery, relay 816 and contact 837 to ground. Energization of relay 816 opens the contacts of the circuits of the relays 813 to 815 so as to prevent any further energization of this group of relays.

At the end of the pause period, the stepping magnet 706 is de-energized to step the wipers to the next contact and they are continued to be stepped until the 2nd pause period. The selecting circuit just traced is now again completed over bank 713 and its 15th contact 747 over conductors 766, relay 808 and battery to ground. Relay 808 closes a locking circuit for itself at armature 825 over conductor 774 and armature 736 to ground. A circuit is also completed for relay 700 from ground through battery relay 700, lines 762, contact 827 to ground. Relay 700 is energized to open the circuit at the armature 718 to prevent any further selection. The locking circuit is also completed for relay 700, at the armatures 717, and 735.

The wipers now continue to be stepped until the 25th contact is reached. At the 25th contact, the circuit for the relay 708 previously traced is opened at bank 715 and its wiper, and after an interval if the pause period occurs at this time, armature 731 closes its contact.

A circuit is then completed from ground, wipers 715, armature 731, conductor 761, contact 826, contact 835, conductor 854, relay 907 and battery to ground. Energization of relay 907 will pull up its armatures 945 and 946 which are locked in position by the armature 944. The original locking circuit for the relay 901 is now opened at armature 946 and a new locking circuit is prepared for the relay 900 at the front contact of armature 946. The circuit for the lamp 948 which indicates an open condition of the circuit breaker, which up to this time has had its circuit completed through the armature 945 and its back contact is now opened and a circuit is completed for the lamp 947 to give to the dispatcher a supervisory indication that the circuit breaker has been closed. This completes the operation and supervisory signalling when the dispatcher operates a key to close a circuit breaker.

In a similar manner, the operation of any other key such as K—2 operates to control the mechanism at the distant station. Operation of any key in other groups would operate in the same way except that being connected to different contacts on the banks 106 to 109, these would stop at different contacts to energize relays other than 156 as illustrated to close the associated circuits for other conductors than 19 and 20.

Similarly, it will be understood that, upon the energization of any other group selecting relay 813 or 814 and a final selecting relay 803 to 808, other signalling devices will operate in response to the operation of their individual units at the remote station. Thus, for example, relays 809 to 811 are individual to specific units at the remote station. In response to the energization of relays 814 and 808 a circuit is completed for relay 811, it being undersood that relays 814 and 808 will energize in response to a code which is transmitted by the unit individual to relay 811. Energization of relay 811, in turn, illuminates lamp 846, indicating to the dispatcher the operation of the remote unit individual to relay 811. Similar operations occur in connection with relays 809 and 810.

The operations that take place to restore the operation to normal will now be explained. The relay 101 which has been held locked through a circuit comprising the armature 922 is deenergized as a result of the de-energization of relay 901, the circuit of which in turn was opened at armature 946. The de-energization of relay 101 opens the circuit for relay 100 at armature 116. The relay 102 which was held energized over armature 921 is de-energized and opens the final circuit for the stepping magnet 105.

The circuit for the relay 160 is opened at the bank and its wiper 143, its armature 182, vibrates for a while in order to hold the code signalling apparatus energized during the 25th pause period. After an interval of time, it stops between its contacts and opens the circuit for the relay 161. Relay 161 is de-energized after an interval of time to de-energize the relay 162. As a result of the de-energization of the relay 161, relay 162 is de-energized and a circuit is completed for the stepping magnet from ground through armature 189, stepping magnet 168, armature 188, and its wiper 146, armature 195 and battery to ground. The stepping magnet 168 is energized and opens its own circuit at 195, upon the de-energization of stepping magnet 168 and the wipers 143 to 146 are stepped from the 25th to the normal or 1st contact. Relays 157 and 163 are de-energized at armature 117 and the circuit for the relay 167 is opened at armature 190. Relay 166 is de-energized by the opening of the circuit of the armature 194.

At the sub-station upon de-energization of relay 200, relay 202 is de-energized after an interval of time and the circuit for relay 201 is opened at wiper 211 on its 25th contact. The relay 203 is de-energized at armatures 217. Relays 204 and 205 are in turn de-energized at armature 222 and 221 respectively and bank and wiper 210. The stepping magnet 208 now completes a circuit for itself over its armature 220, armature 219, bank and wiper 212 to ground. The stepping magnet is energized and then de-energized at armature 220 to step the banks from the 25th to the 1st contact. Relay 206 is now opened at bank 212 and it in turn opens the circuit for the relay 207. In a similar manner the supervisory sender and receiver are restored to normal.

In a manner similar to that already described the dispatcher can send operating signals to operate either relay 415 or relay 416 momentarily energized at the 25th contact of the code receiver. Energization of relay 415 will close its armature 447 and 448 to transmit current through the motor 413 in one direction, to rotate the arm 412 in one direction to change the resistance. Energization of relay 416 will reverse the current from 413 to cause it to rotate in the opposite direction. If the resistance is increased in the first instance given, it will be decreased in the second example and correspondingly vary the current in a field magnet winding 432 in series with it. In response to the energization of relays 415 or 416 for a limited time, the arm 412 will be rotated a given amount and if it is desired to further rotate the arm, further codes will be sent to again energize relays 415 or 416.

By operating relays 419 or 420 in a similar manner by operating impulses from the dispatcher's office, the Kelvin balance 425 can be connected across the line by energizing relays 418 to close the contacts across the secondary winding of the transformer 417. Indications of this meter are transmitted over the lines 252 and 251 which are independent of the operating and supervisory signalling conductor whereby continuous meter indications may be obtained with non-interference by signalling.

Relays 418 and 419 are energized as described above, the Kelvin balance operates, and a current is transmitted from ground through battery, resistance 426, the galvanometer 429, through the front contact and armature 452 over conductor 351 and through the contact 880 of relay 881, to the indicator 882 individual thereto, it being understood that the relay 881 was previously energized in response to the energization of relay 813 and relay 807, in response to the code individual thereto. This code is transmitted in the manner described in connection with any one of the other apparatus units.

As shown above, by means of gearing 433, circuit arrangements controlled by the governor 402 regulate the gate opening 407. The amount of gate opening is indicated to the dispatcher by the movements of the contact over stationary contact members 408 which controls the relays 409 and 410 to send supervisory indications in a manner similar to the supervisory indications already described. When the gate opening changes, as for example, to engage contact 408, an energizing circuit is completed for the relays 409 and 603 in series. Relay 409 operates its armatures 443 and 444 into engagement with their front contacts. Energization of relay 603 completes a circuit for the stepping magnet 506 which thereupon steps the finder switches 609 to 612 until the position individual to the gate and its particular opening is reached. Thereupon the code sender switches 648 to 651 are started into operation to transmit a code to the receiving station equivalent to the particular position at which the switch wipers stop and this code, of course, is individual to the particular gate and its opening Similarly, by the operation of indicator 1021 and 1046 the oil gauge and temperature gauge indications can be transmitted to the dispatcher.

The system described discloses one modified form to which my invention may be applied. It is obvious, however that there are a number of other systems which are based on the same principle of selection as disclosed and to which accordingly my invention may be applied. I do not intend to limit myself to the particular form used to illustrate my invention except as specified in the appended claims.

I claim as my invention:

1. In a supervisory control system, a first station, a second station, apparatus units at said second station, signalling devices individual to each of said apparatus units at said first station, a signalling line connecting said stations, a finder switch at said second station comprising a bank of contacts, a code sender at said second station including a bank of contacts, a circuit extending from a contact on said finder bank to a plurality of contacts on said code sender bank, an electromagnetic means interposed between said finder switch and said code sender for selectively determining which of said plurality of contacts on said code sender bank is extended to the said contact on said finder switch bank, said apparatus units at the second station being arranged in groups, means responsive to the operation of one of said apparatus units in one of said groups for energizing said electromagnetic means interposed between said finder and said code sender, means controlled by the operation of said apparatus unit for operating said finder to said mentioned contact on the finder bank, means responsive to the operation of said finder to start said code sender for transmitting code combinations of impulses to said first station and means at said first station responsive to said code combinations of impulses for operating the signalling device individual to said operated apparatus unit.

2. In a supervisory control system, a first station, a second station, apparatus units at said second station, signalling devices individual to each of said apparatus units at said first station, a signalling line connecting said stations, a finder switch at said second station comprising a bank of contacts, a code sender at said second station including a bank of contacts, a circuit extending from a contact on said finder bank to a plurality of contacts on said code sender bank, an electromagnetic means interposed between said finder switch and said code sender for selectively determining which of said plurality of contacts on said code sender bank is extended to the said contacts on said finder switch bank, said apparatus units at the second station being arranged in groups and each contact on the finder being common to a group, means controlled by the operation of any one of said apparatus units for operating said finder switch to a position individual to the group and for selectively operating one of said electromagnetic means, means jointly controlled by said finder switch and said electromagnetic means for controlling the transmission of a code by said code transmitter over said signalling line, and means at said first station responsive to said code for operating the signalling device individual to said operated apparatus unit in accordance with the operation of said unit.

In testimony whereof, I have hereunto subscribed my name this 4th day of November, 1925.

THOMAS U. WHITE.